(12) United States Patent
Jennison et al.

(10) Patent No.: US 9,452,794 B1
(45) Date of Patent: Sep. 27, 2016

(54) CURTAINSIDE MOVABLE WALL SYSTEM

(71) Applicant: Brown Industries, LLC, Lawrence, KS (US)

(72) Inventors: Dane Jennison, Lawrence, KS (US); Bryce White, Lawrence, KS (US)

(73) Assignee: BROWN INDUSTRIES, LLC, Lawrence, KS (US)

( * ) Notice: Subject to any disclaimer, the term of this patent is extended or adjusted under 35 U.S.C. 154(b) by 0 days.

(21) Appl. No.: 14/687,598

(22) Filed: Apr. 15, 2015

(51) Int. Cl.
*B62D 33/08* (2006.01)
*B62D 33/027* (2006.01)
*B62D 65/02* (2006.01)
*B60P 7/14* (2006.01)

(52) U.S. Cl.
CPC ............... *B62D 33/08* (2013.01); *B60P 7/14* (2013.01); *B62D 33/027* (2013.01); *B62D 65/024* (2013.01)

(58) Field of Classification Search
CPC ..... B60P 7/14; B62D 33/023; B62D 33/027; B62D 33/08; B62D 65/024
USPC ................... 296/147, 148, 155, 186.1, 186.4
See application file for complete search history.

(56) References Cited

U.S. PATENT DOCUMENTS

| | | | |
|---|---|---|---|
| 1,646,604 A | 10/1927 | Wells | |
| 2,170,021 A | 8/1939 | Greegor | |
| 3,057,284 A | 10/1962 | Learmont | |
| 3,140,116 A | 7/1964 | Speas | |
| 3,191,546 A | 6/1965 | Adler | |
| 3,324,595 A | 6/1967 | Loomis | |
| 3,376,599 A | 4/1968 | Singer | |
| 3,709,552 A * | 1/1973 | Broadbent | B60J 5/065 160/330 |
| 4,049,311 A | 9/1977 | Dietrich et al. | |
| 4,221,421 A | 9/1980 | Bettker, Jr. et al. | |
| 4,639,031 A | 1/1987 | Truckenbrodt | |
| 4,856,843 A * | 8/1989 | Elliott | B60P 3/42 160/213 |
| 5,026,112 A * | 6/1991 | Rice | B62D 33/04 296/155 |
| 5,154,480 A * | 10/1992 | Jones | B60P 3/42 105/378 |
| 5,472,300 A | 12/1995 | Lipschitz | |
| 6,247,740 B1 | 6/2001 | Smith | |

* cited by examiner

Primary Examiner — Jason S Daniels
(74) Attorney, Agent, or Firm — Husch Blackwell LLP (57) ABSTRACT

A cargo containment body with movable wall panels that always remain substantially parallel to a vertical side of the cargo containment body.

25 Claims, 13 Drawing Sheets

CURTAINSIDE MOVABLE WALL SYSTEM

This invention pertains to a curtainside movable wall system comprising a cargo containment body with movable wall panels that always remain substantially parallel to a vertical side of the cargo containment body.

BRIEF DESCRIPTION OF THE DRAWINGS

The following drawings illustrate the concepts of the present invention, and are not necessarily drawn to scale.

DETAILED DESCRIPTION OF SOME EMBODIMENTS

While the present invention is susceptible of embodiment in various forms, there is shown in the drawings and will hereinafter be described some embodiments with the understanding that the present disclosure is to be considered an exemplification of the invention and is not intended to limit the invention to the specific embodiments illustrated or described.

Figure 7:
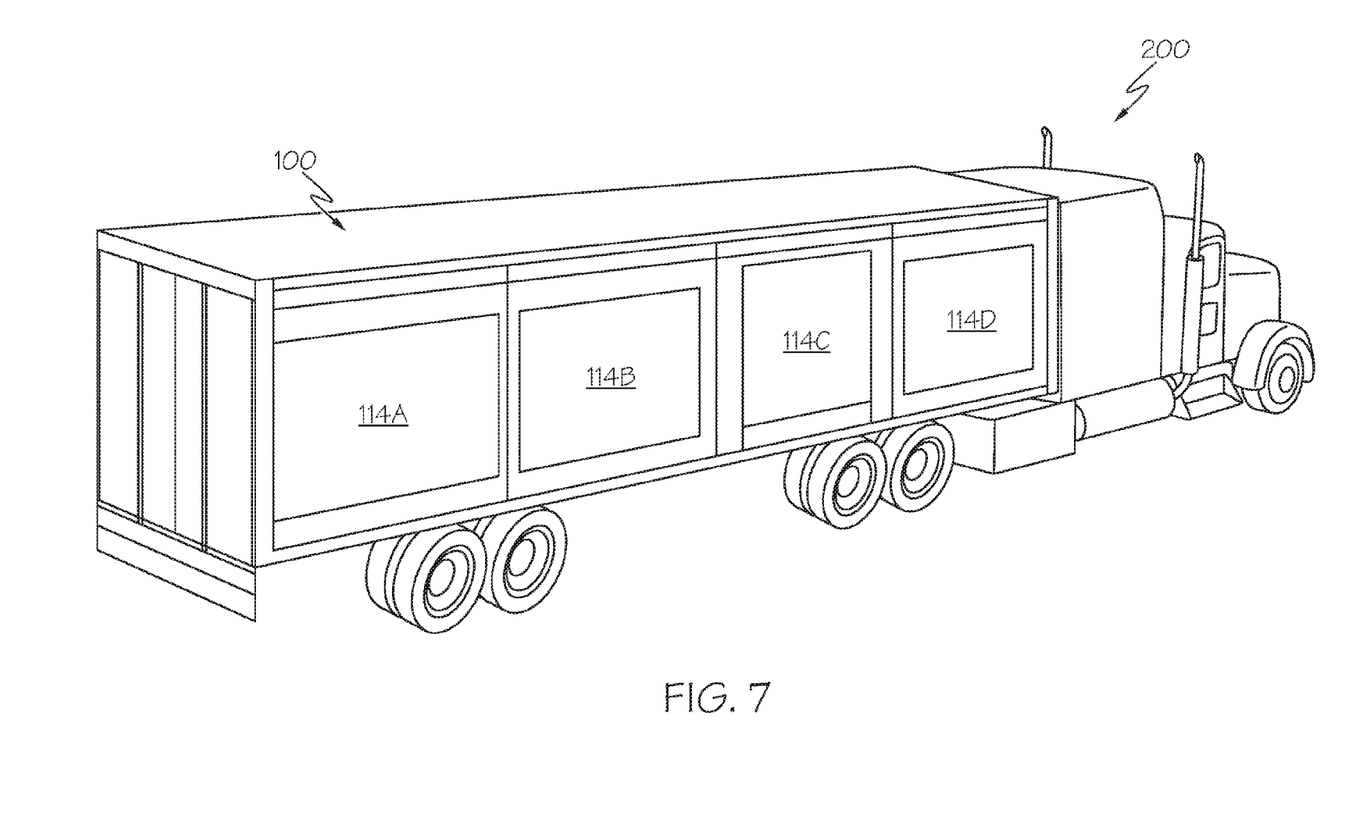
FIG. 7 shows a perspective view of an exemplary truck with an attached cargo containment body.

Cargo being transported by a transportation carrier such as a truck, a rail car, or a ship is typically contained in large box-shaped cargo containment body. The example of FIG. 7 shows a cargo containment body 100 attached to a motor-powered truck vehicle 200. Different cargo containment bodies are designed differently depending on their intended uses. Two common designs are standard dry freight bodies and curtainside bodies.

A standard dry freight body is basically a rectangularly-shaped box, defined by a longitudinal axis extending between a front and a rear, a lateral axis orthogonal to the longitudinal axis and extending between left and right sides, and a vertical axis orthogonal to the longitudinal axis and to the lateral axis and extending between a top and a bottom. There is a ceiling and a floor in the top and bottom, vertical walls in the left and right sides, and vertical walls in the front and rear. Typically, the rear wall comprises a door that can be opened to allow loading and unloading of cargo. There often are one or more other doors in one or both of the side walls. However, loading or unloading lengthy cargo through the available doors can be difficult and time-consuming.

In a curtainside body, one or both of the side walls is removed. This greatly facilitates the loading and unloading of lengthy cargo. A curtain that easily can be pushed aside is hung on each open side to protect the loaded cargo from inclement weather. A disadvantage of the curtainside body is that there are few attachment points on an open side to secure smaller cargo. By contrast, a standard dry freight body has rigid walls on each side that facilitate fastening small cargo from both sides.

Transportation carrier companies often keep both standard freight body carriers and curtainside body carriers available to meet whichever needs are required. This can be inefficient whenever the mix of current needs does not align with the mix currently available cargo containment bodies.

Figure 1A:
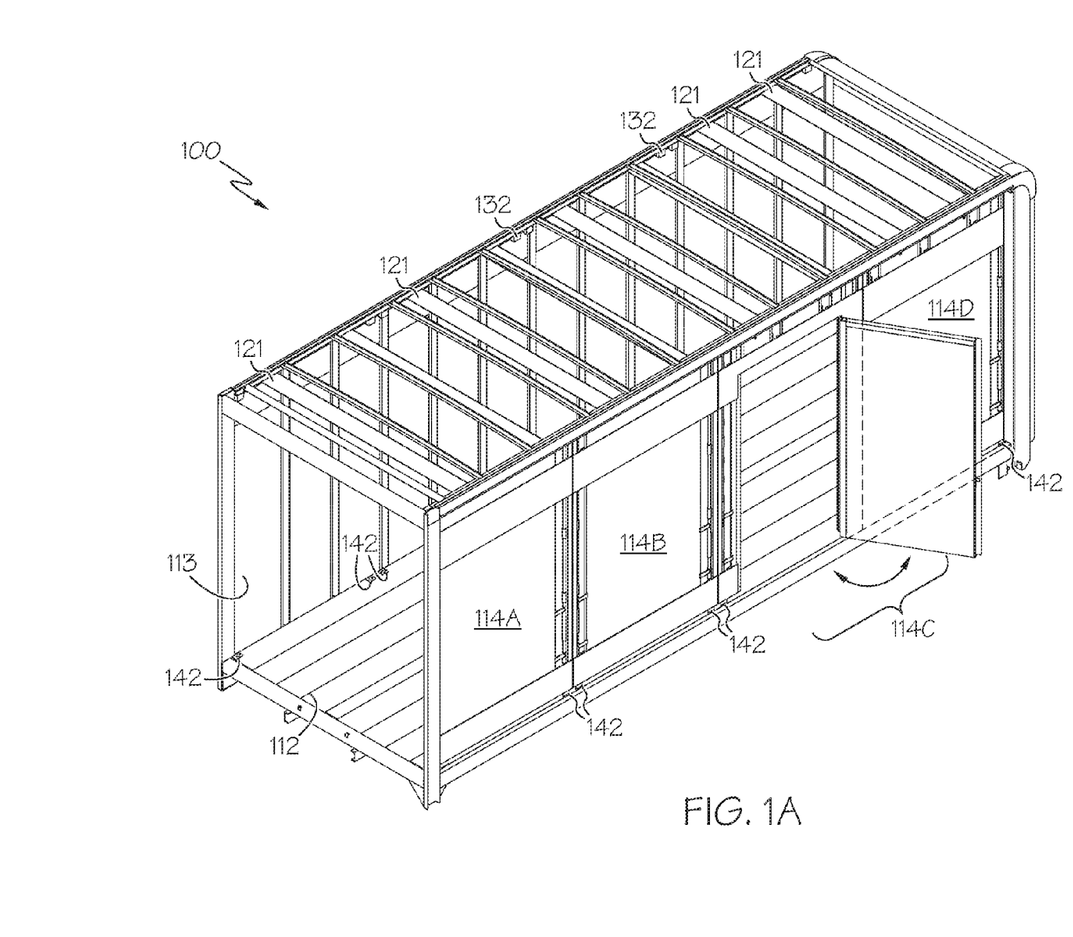
FIG. 1A shows an isotropic view of an exemplary cargo containment body, without showing a ceiling or a rear wall, and with four movable wall panels in their moved positions.
Figure 1B:
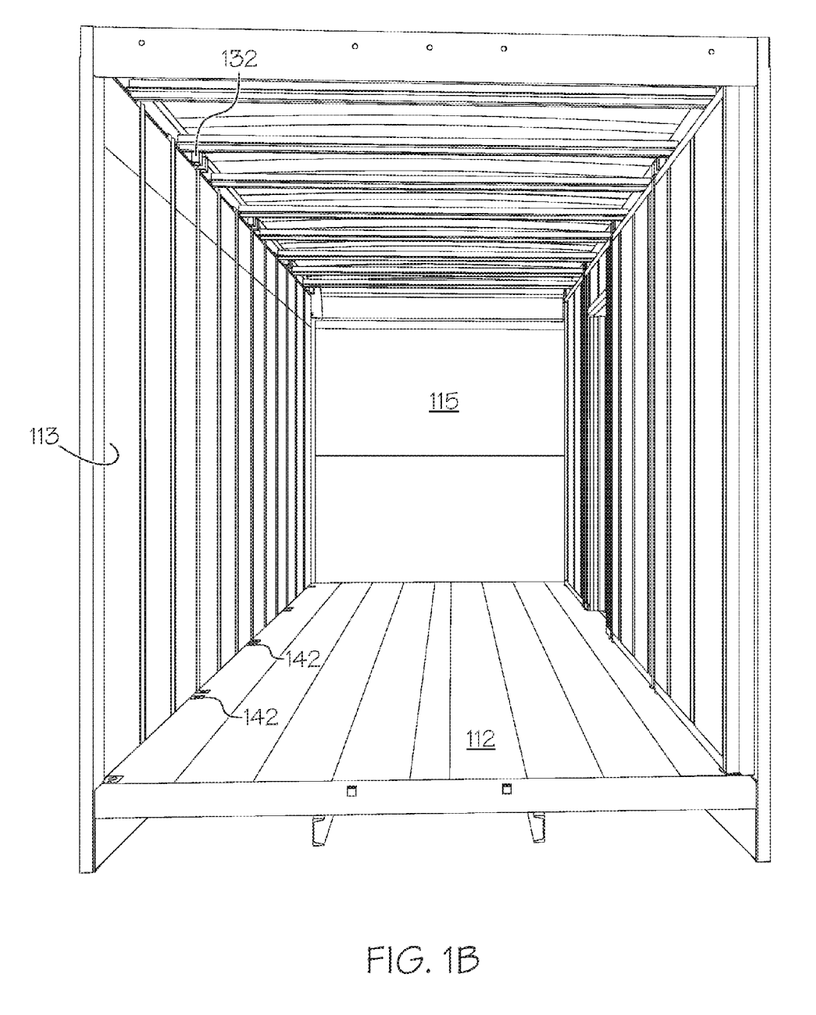
FIG. 1B shows a rear perspective view of the cargo containment body as illustrated in FIG. 1A.
Figure 4A:
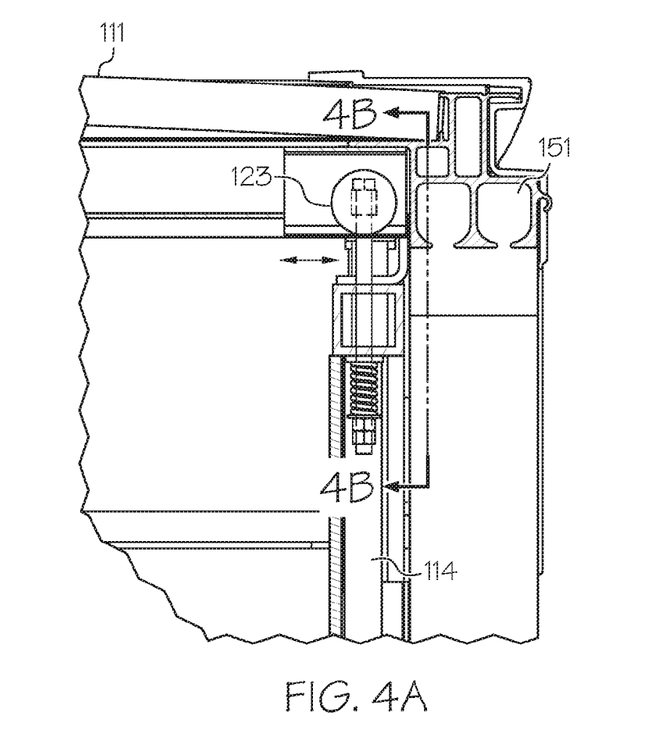
FIG. 4A shows a partial cross-section elevation view in a direction of the longitudinal axis, showing an exemplary movable wall panel suspended from a trolley in a cargo containment body as in FIG. 1A.
Figure 4B:
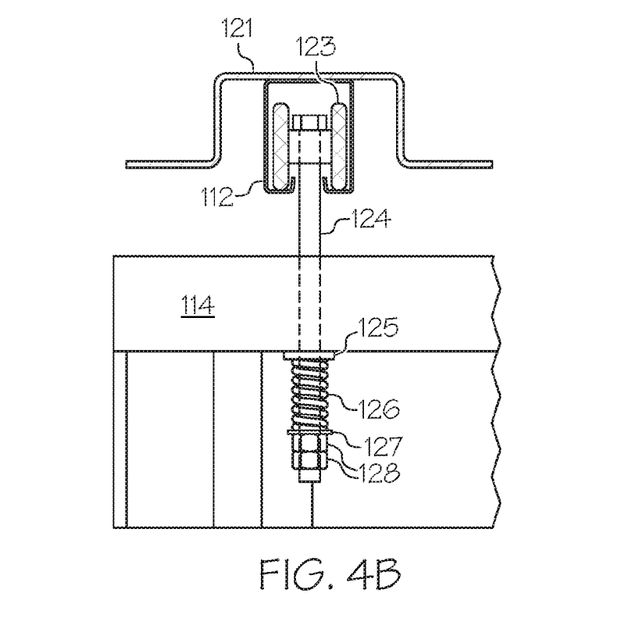
FIG. 4B shows an enlarged partial cross-section elevation view of the movable wall panel of FIG. 4A in a direction of the lateral axis, indicated by 4B-4B in FIG. 4A.

FIGS. 1A and 1B show an embodiment of a cargo containment body 100 that combines the loading convenience of a curtainside body with the wall stability of a standard dry freight body. Movable wall panels 114 are added to a curtainside body. They are suspended by trolleys 123 that roll on lateral trolley rails 122, as seen in FIGS. 4A and 4B. For lengthy cargo, the movable wall panels 114 can be secured in stowed positions adjacent a fixed vertical wall 113 on the left side, leaving an open right side and the loading convenience of a curtainside body. A curtain that can be pushed aside easily can be hung from a curtain track 151, shown in FIGS. 4A and 5A. Curtain track 151 is one means for supporting a curtain. For small cargo, the movable wall panels 114 can be secured on the right side, providing the wall stability of a standard dry freight body on both sides. There also can be doors in a rear wall (not shown), the fixed vertical wall 113, or any of the movable wall panels 114. A door is illustrated in movable wall panel 114C in the various figures.

Figure 9:
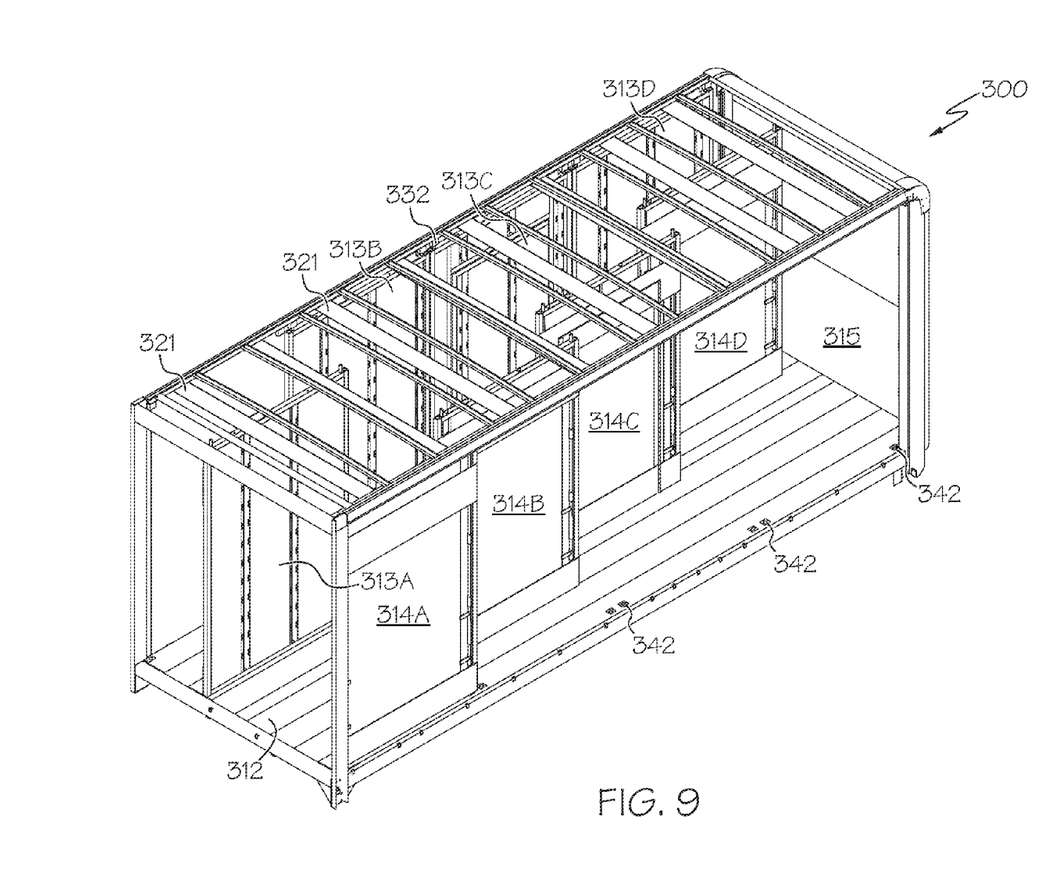
FIG. 9 shows an isotropic view of an exemplary cargo containment body, without showing a ceiling or a rear wall, and with eight movable wall panels so that either side of the cargo containment body can be an open side.

FIG. 9 illustrates an embodiment of a cargo containment body 300 with movable wall panels 313 on the left side and movable wall panels 314 on the right side. Movable wall panel 314A is shown on the right side, movable wall panels 313B, 313C and 313D are shown on the left side, and movable wall panels 314B, 314C, 314D and 313A are shown in different locations, respectively, on their ways from one side of the cargo containment body 300 to the other. Trolley rail boxes 321, top lock rod keepers 332, bottom lock rod keepers 342, floor 312 and front wall 315 also are shown. A ceiling and a rear wall are not shown in order to expose more of the inside of the cargo containment body 300. Having movable wall panels on both sides adds the flexibility of loading lengthy cargo from either side, or of loading it from one side in the front of the cargo containment body and from the other side in the rear.

Returning to the embodiment of cargo containment body 100, FIGS. 1A and 1B illustrate the fixed vertical wall 113 on the left side, the front wall 115, a floor 112, trolley rail boxes 121 in the top, top lock rod keepers 132, bottom lock rod keepers 142, and the four movable wall panels 114 that are labelled 114A, 114B, 114C and 114D. In each of these two views, a ceiling 111 (seen in FIG. 4A) and a rear wall are not shown in order to expose more of the inside of the cargo containment body 100. In each of these two views, each of the four movable wall panels 114 is secured in its moved location on the right side of the cargo containment body 100.

Figure 2A:
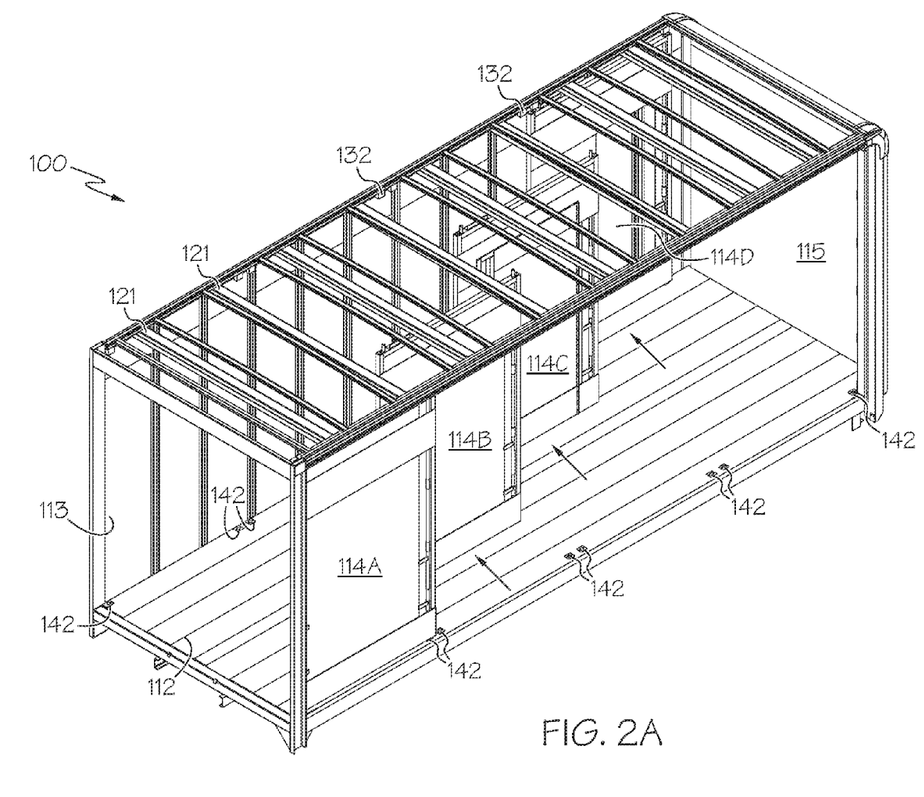
FIG. 2A shows an isotropic view of the cargo containment body of FIG. 1A, with the four movable wall panels in different respective positions.
Figure 2B:
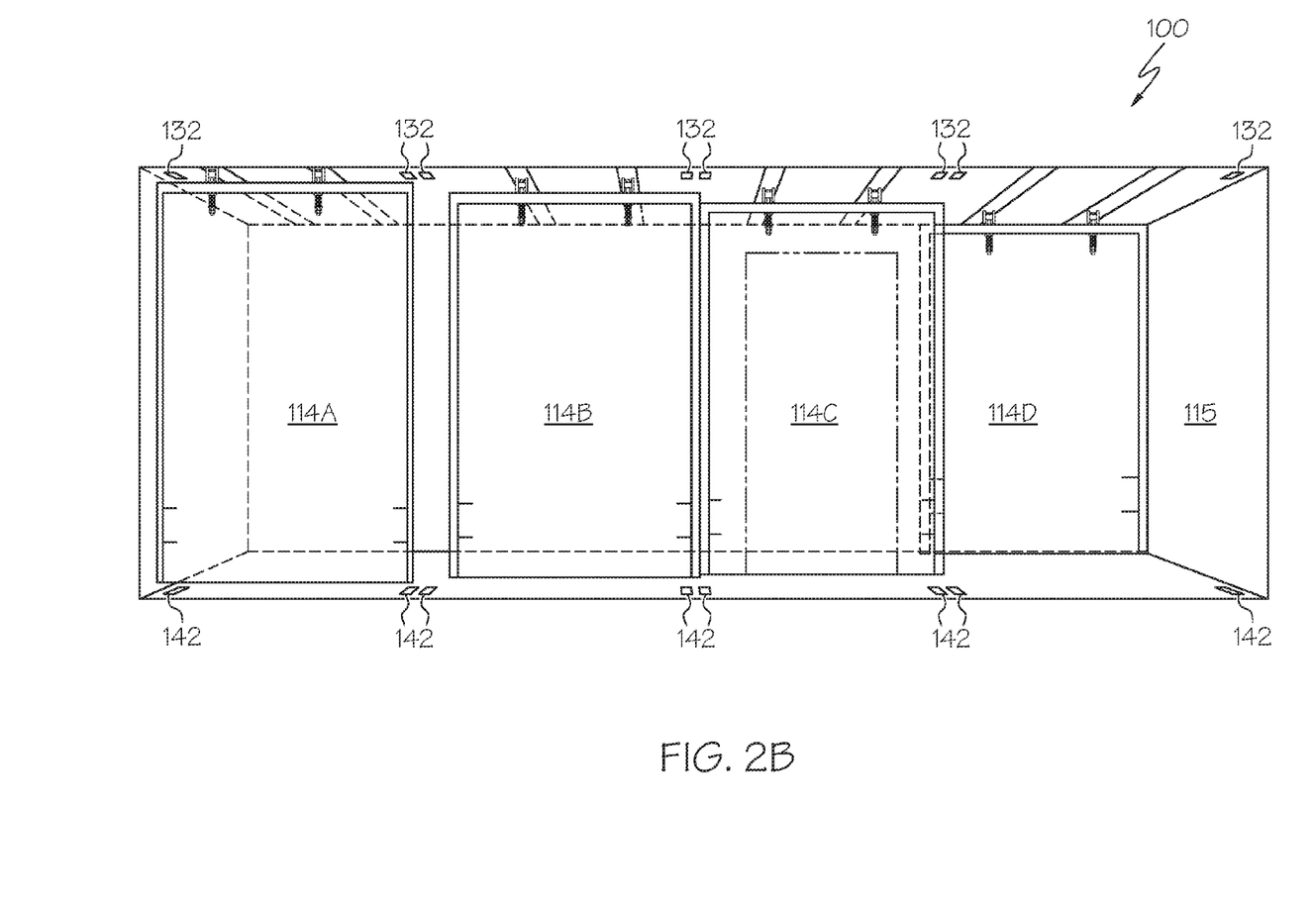
FIG. 2B shows a side perspective view of the cargo containment body as illustrated in FIG. 2A.

FIGS. 2A and 2B show the embodiment of the cargo containment body 100 of FIG. 1A, with the four movable wall panels 114 in different respective locations. That is, movable wall panel 114A is in its moved location on the right side of the cargo containment body 100, as is shown in FIGS. 1A and 1B. Movable wall panel 114D is in its stowed location adjacent fixed vertical wall 113 on the left side of the cargo containment body 100. Movable wall panels 114B and 114C are in different locations, respectively, on their ways from one side of the cargo containment body 100 to the other.

FIGS. 2A and 2B illustrate the fixed vertical wall 113 on the left side, the front wall 115, the floor 112, trolley rail boxes 121 in the top, top lock rod keepers 132, bottom lock rod keepers 142, and the four movable wall panels 114 that are labelled 114A, 114B, 114C and 114D. Again, in each of these two views, the ceiling 111 and the rear wall are not shown in order to expose more of the inside of the cargo containment body 100.

Figure 3A:
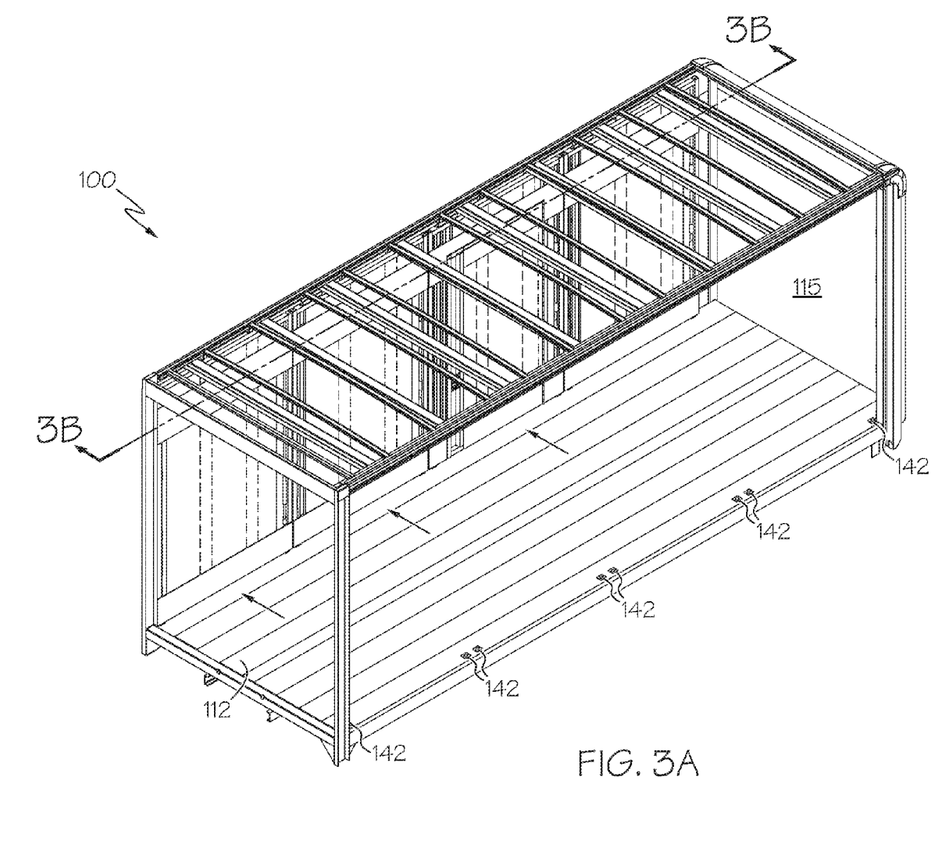
FIG. 3A shows an isotropic view of the cargo containment body of FIG. 1A, with the four movable wall panels in their stowed positions.
Figure 3B:
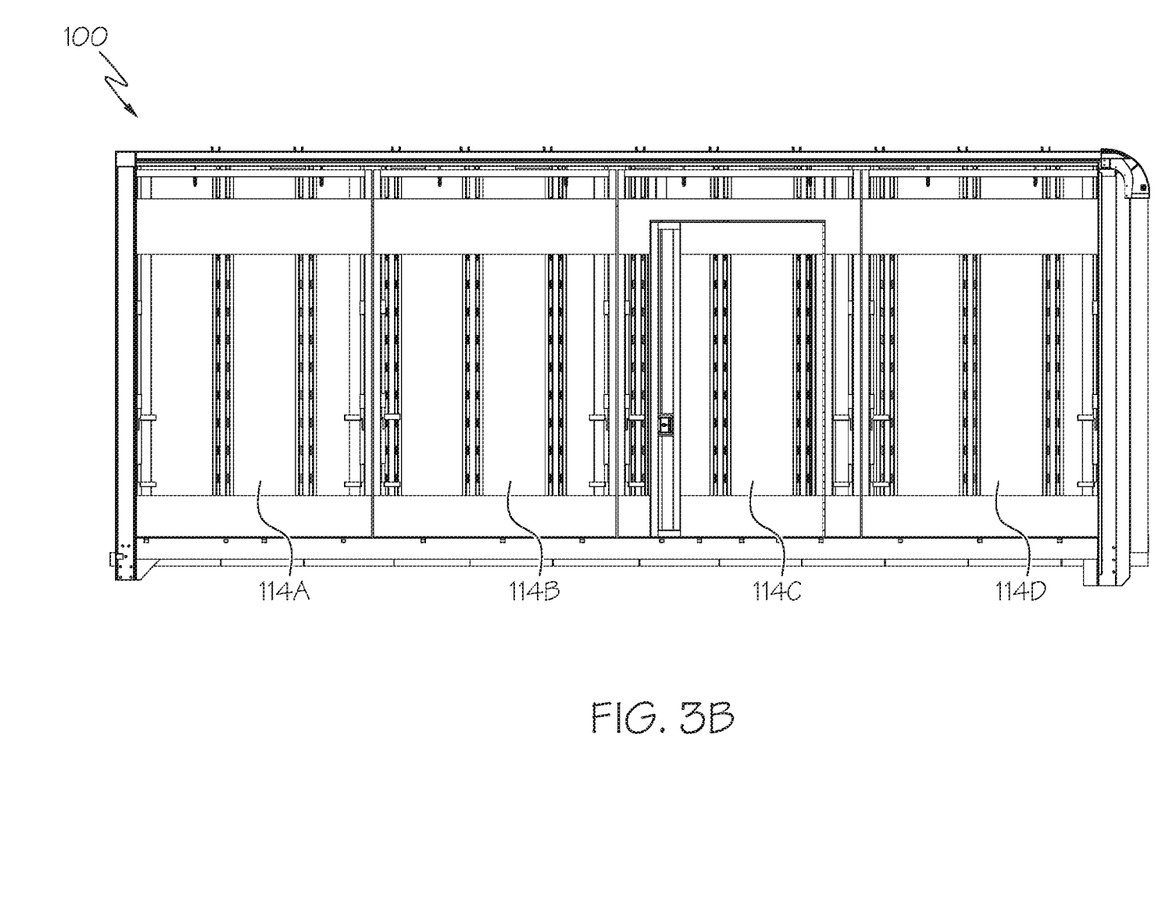
FIG. 3B shows a cross-section view taken along 3B-3B in FIG. 3A.

FIGS. 3A and 3B show the embodiment of the cargo containment body 100 of FIG. 1A, with the four movable wall panels 114 in their stowed locations adjacent fixed vertical wall 113 on the left side of the cargo containment body 100.

FIGS. 3A and 3B illustrate the front wall 115, the floor 112, trolley rail boxes 121 in the top, bottom lock rod keepers 142, and the four movable wall panels 114 that are labelled 114A, 114B, 114C and 114D. Again, in each of these two views, the ceiling 111 and the rear wall are not shown in order to expose more of the inside of the cargo containment body 100.

It is noted that the four movable wall panels 114 do not all have to be on one side or all have to be on the other side of the cargo containment body 100 when cargo is being transported. That is, an operator may choose to move some of the movable wall panels 114 to the right side, while leaving the other movable wall panels 114 adjacent the fixed vertical wall 113 on the left side of the cargo containment body 100.

In the example of FIGS. 1A, 2A and 3A, those figures show multiple trolley rail boxes 121 extending across the top of the cargo containment body 100 parallel to the lateral axis. FIG. 4A shows a partial cross-section elevation view in a direction of the longitudinal axis, showing an exemplary movable wall panel 114 suspended from a trolley 123, and FIG. 4B shows an enlarged partial cross-section elevation view of the movable wall panel 114 of FIG. 4A in a direction of the lateral axis, indicated by 4B-4B in FIG. 4A. As seen best in FIG. 4B, the trolley rail box 121 covers and supports a trolley rail 122 and the trolley 123 rolls on the trolley rail 122. In the example of FIG. 4B, the suspension connection between the trolley 123 and the movable wall panel 114 comprises a bolt 124, a compression spring 126, a nut 128, and washers 125 and 127. The illustrated example is one means for moving a movable wall panel between the first side and the second side of the cargo containment body 100.

Figure 8:
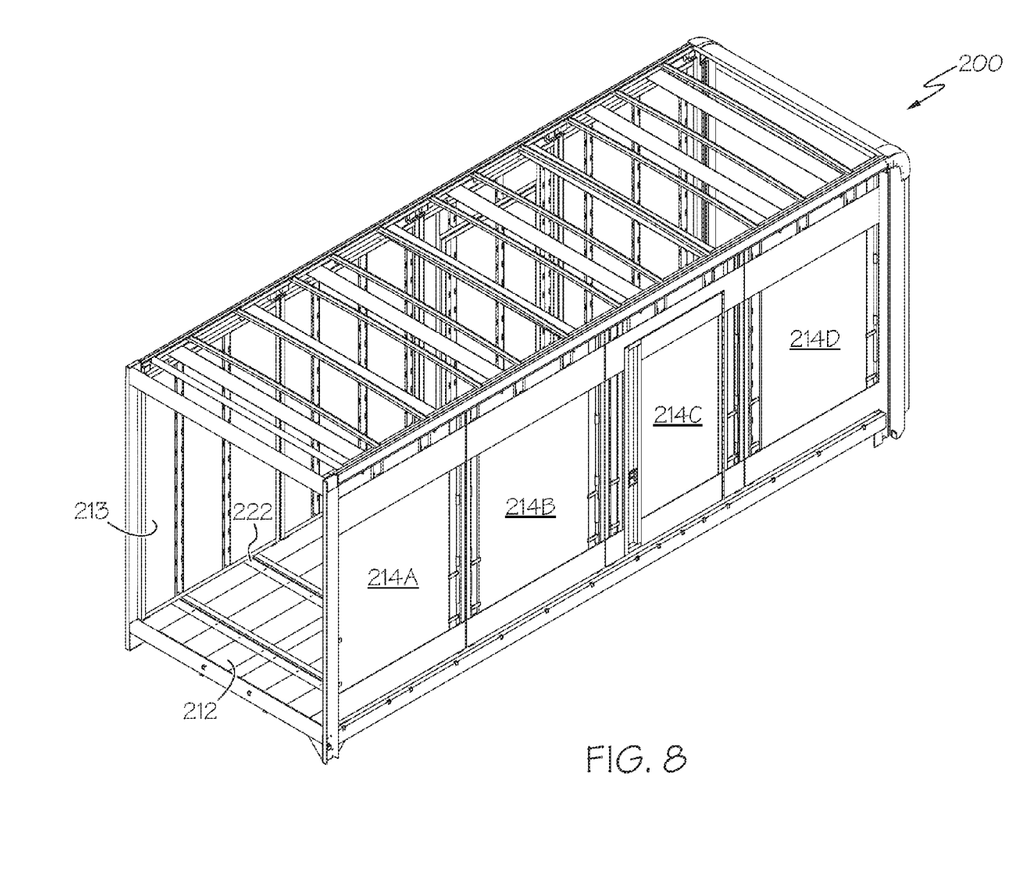
FIG. 8 shows an isotropic view of an exemplary cargo containment body, without showing a ceiling or a rear wall, with four movable wall panels in their moved positions, and also showing floor tracks.

In the example of FIGS. 1A, 2A and 3A, each movable wall panel 114 is suspended from two parallel trolley rails 122 that are not used by any of the other movable wall panels 114, and each of the movable wall panels 114 is movable independently of the other movable wall panels 114. In other embodiments different movable wall panels can share trolley rails or even trolleys, and a single movable wall panel can be suspended from a different number of trolley rails. Other systems that do not include trolley rails may be used for moving the movable wall panels in different embodiments. For example, movable wall panels can be suspended from wires that move in a lateral direction or from rings that can slide over a stationary wire. In another example seen in FIG. 8, movable wall panels also can roll in floor tracks. These are each other means for moving a movable wall panel between a first side and a second side of a cargo containment body. FIG. 8 illustrates cargo containment body 200, with floor 212, fixed vertical wall 213 on the left side, and movable wall panels 214A through 214D that are movable in floor tracks 222. A ceiling and a rear wall are not shown in order to expose more of the inside of the cargo containment body 200.

Returning to embodiment of FIG. 1A, each of the movable wall panels 114 can be secured either on the left side or on the right side of the cargo containment body 100, by inserting a pair of top lock rods 131 and a pair of bottom lock rods 141 in top lock rod keepers 132 and bottom lock rod keepers 142, respectively. The example illustrated in the figures, including the figures discussed below, is one means for securing a movable wall panel so that it does not move. Other embodiments can use a different number of lock rods, only top lock rods, only bottom lock rods, various wires, various bolts, and so forth, or other means for securing a movable wall panel as is known in the art.

Figure 5:
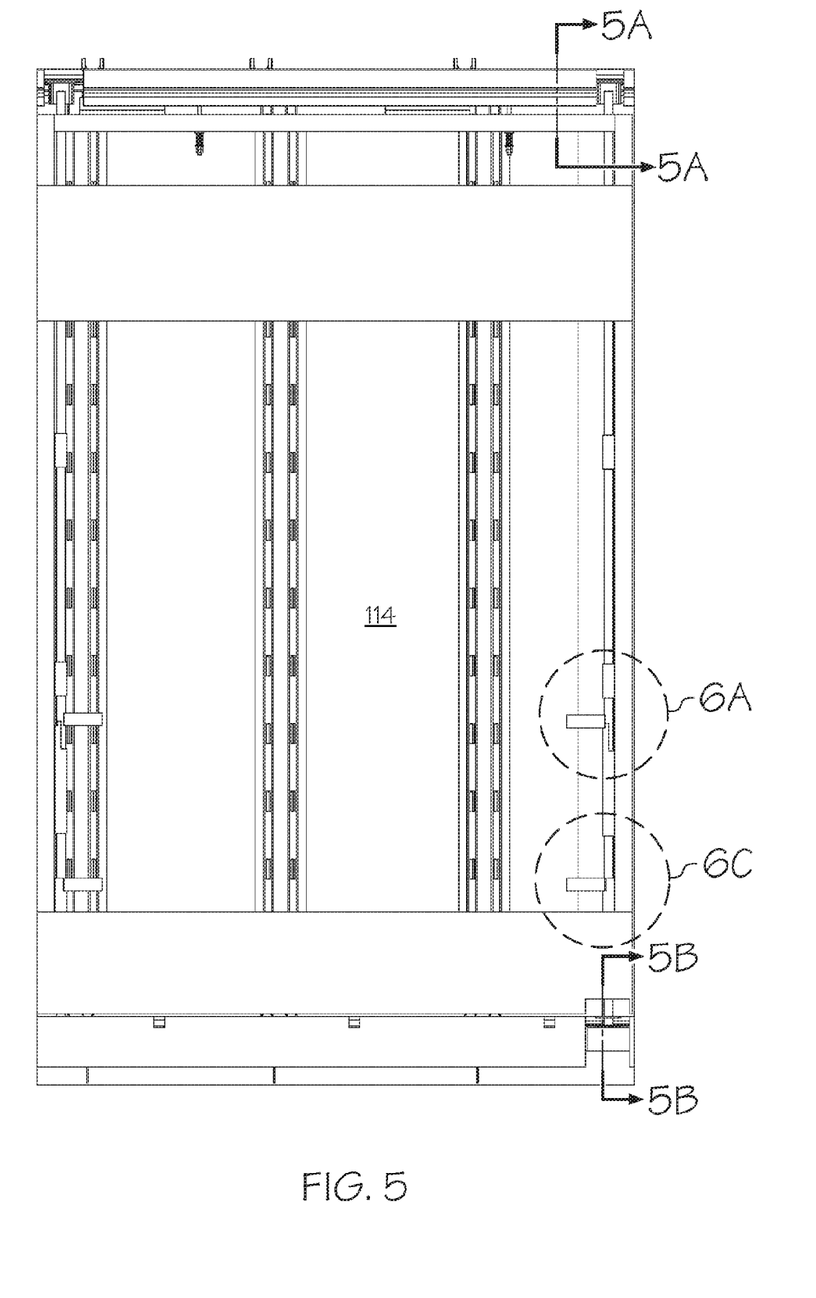
FIG. 5 shows a partial elevation view in a direction of the lateral axis, showing an exemplary movable wall panel with top and bottom lock rods in a cargo containment body as in FIG. 1A.
Figures 5A, 5B, 5C:
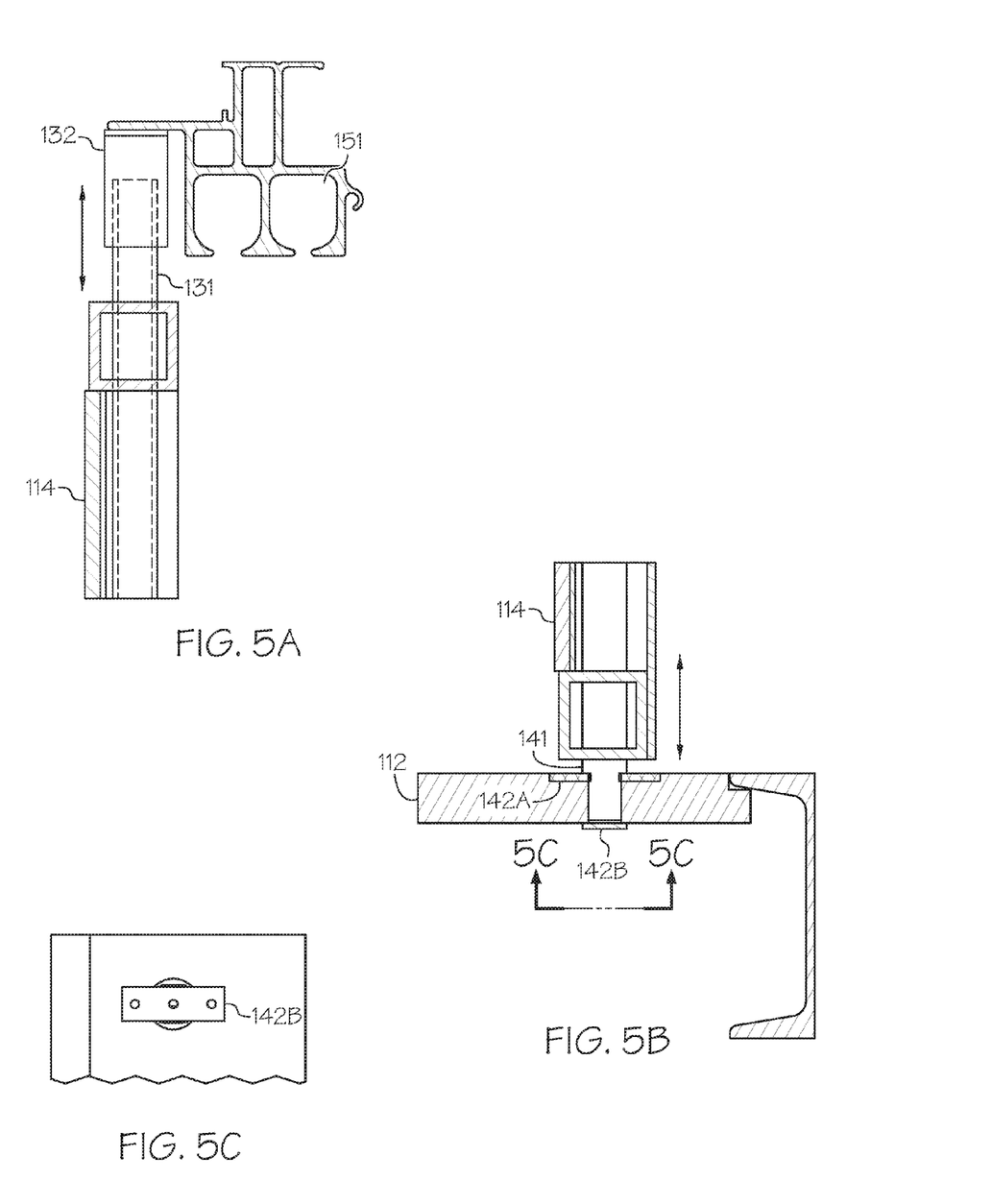
FIG. 5A shows an enlarged partial cross-section elevation view of a top lock rod of FIG. 5 in the direction of the longitudinal axis, indicated by 5A-5A in FIG. 5.
FIG. 5B shows an enlarged partial cross-section elevation view of a bottom lock rod of FIG. 5 in the direction of the longitudinal axis, indicated by 5B-5B in FIG. 5.
FIG. 5C shows a partial bottom view of the bottom plate of FIG. 5B, taken along 5C-5C in FIG. 5B.
Figure 6A:
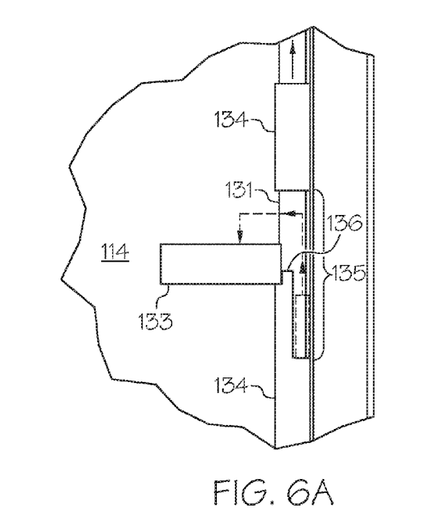
FIG. 6A shows an enlarged view of the detail marked 6A in FIG. 5.
Figure 6B:
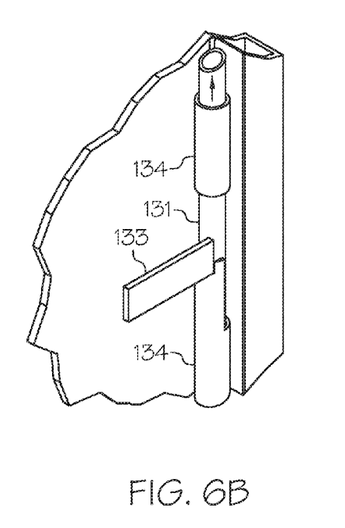
FIG. 6B shows a perspective view of a top lock rod handle as illustrated in FIG. 6A.

FIG. 5 is a partial elevation view in a direction of the lateral axis, showing an exemplary movable wall panel 114 with top and bottom lock rods in a cargo containment body 100. FIG. 5A shows an enlarged partial cross-section elevation view of a top lock rod 131 of FIG. 5 in the direction of the longitudinal axis, indicated by 5A-5A in FIG. 5. FIGS. 6A and 6B show enlarged views of a top lock rod handle 133 of FIG. 5.

The top lock rod 131 is movable in a top lock rod sleeve 134. The top lock rod handle 133 is attached to the top lock rod 131, and protrudes through a gap 135 in the top lock rod sleeve 134. A lower portion of the gap 135 limits rotation of the handle 133 about an axis of the top lock rod 131. If the handle 133 lifts the top lock rod 131 in the sleeve 134 until a top end of the top lock rod 131 is received in the top lock rod keeper 132, an upper portion of the gap 135 allows the handle 133 to rotate about the axis of the top lock rod 131 to a resting position in a step notch 136. If the handle 133 is in the step notch 136, the top end of the top lock rod 131 will be retained in the top lock rod keeper 132, and the movable wall panel 114 will not be able to move. The dashed lines in FIG. 6A show the upward movement and rotation of the handle 133 from the lower portion of the gap 135 to the resting position in the step notch 136.

Figure 6C:
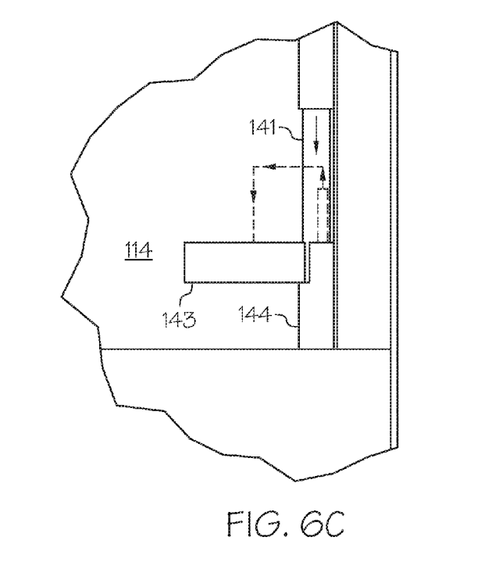
FIG. 6C shows an enlarged view of the detail marked 6C in FIG. 5.
Figure 6D:
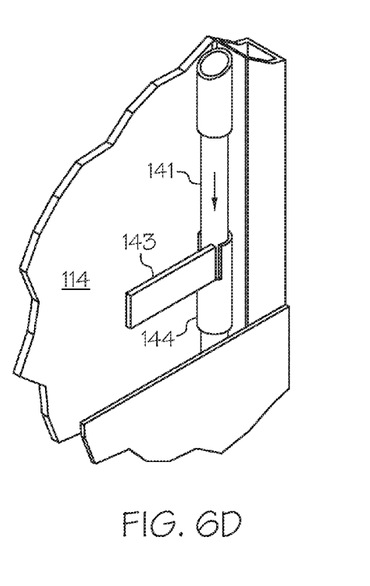
FIG. 6D shows a perspective view of a bottom lock rod handle as illustrated in FIG. 6C.

FIG. 5B shows an enlarged partial cross-section elevation view of a bottom lock rod 141 of FIG. 5 in the direction of the longitudinal axis, indicated by 5B-5B in FIG. 5. FIGS. 6C and 6D show enlarged views of a bottom lock rod handle 143 of FIG. 5. As seen in FIG. 5B, the bottom lock rod keeper 142 is formed in the floor 112. The opening in the floor 112 is surrounded by a keeper plate 142A, and covered underneath by a bottom plate 142B on which the bottom lock rod 141 can rest. FIG. 5C shows a partial bottom view of the bottom plate of FIG. 5B, taken along 5C-5C in FIG. 5B. As an example of another bottom lock rod keeper, the opening in the floor 112 can surround a metal sleeve that receives the bottom lock rod 141, eliminating the keeper plate 142A and the bottom plate 142B.

The bottom lock rod 141 is movable in a bottom lock rod sleeve 144. The bottom lock rod handle 143 is attached to the bottom lock rod 141, and protrudes through a gap in the bottom lock rod sleeve 144. A lower portion of the gap limits rotation of the handle 143 about an axis of the bottom lock rod 141. If the handle 143 lifts the bottom lock rod 131 in the sleeve 144 until a bottom end of the bottom lock rod 141 is removed from the bottom lock rod keeper 142, an upper portion of the gap allows the handle 143 to rotate about the axis of the bottom lock rod 141 to a resting position in a step in the gap. If the handle 143 is on the step, the bottom end of the bottom lock rod 141 will be retained out of the bottom lock rod keeper 142 while the movable wall panel 114 is being moved. The dashed lines in FIG. 6C show the rotation and downward movement of the handle 143 from the resting position on the step to the lower portion of the gap.

The illustrations in the figures show only one example of how to raise or lower the top lock rod 131 and the bottom lock rod 141, and of how to retain the lock rods 131 and 141 in or out of its respective keeper 132 and 142. Numerous other examples are known in the art.

From the foregoing, it will be understood that numerous modifications and variations can be effectuated without departing from the true spirit and scope of the novel concepts of the present invention. It is to be understood that no limitation with respect to the specific embodiments illustrated and described is intended or should be inferred.

What is claimed is:

1. A cargo containment body, for attachment to a transportation carrier and containment of cargo being transported by the transportation carrier, the cargo containment body having a longitudinal axis extending between a front and a rear of the cargo containment body, having a lateral axis orthogonal to the longitudinal axis and extending between first and second sides of the cargo containment body, and having a vertical axis orthogonal to the longitudinal axis and to the lateral axis and extending between a top and a bottom of the cargo containment body, the cargo containment body comprising:
    at least one movable wall panel that is movable in the direction of the lateral axis, and that always remains substantially parallel to the longitudinal axis and substantially parallel to the vertical axis;
    wherein the at least one movable wall panel is sufficiently rigid so that it constitutes a wall to which the cargo may be stably affixed on the second side, if the at least one movable wall panel is secured at the second side; and
    alternatively, wherein the cargo can be loaded and unloaded through the second side if the at least one movable wall panel is moved away from the second side and toward the first side.

2. The cargo containment body as in claim 1, further comprising:
    at least one trolley rail in the top, the at least one trolley rail extending substantially parallel to the lateral axis between the first side and the second side; and
    at least one trolley that is movable along the at least one trolley rail between the first side and the second side;
    wherein the at least one movable wall panel is suspended from the at least one trolley so that the at least one movable wall panel is movable with the at least one trolley between the first side and the second side.

3. The cargo containment body as in claim 2, wherein
    the at least one trolley rail comprises a plurality of trolley rails; and
    the at least one trolley comprises a plurality of trolleys, each of the plurality of trolleys being movable along only one of the plurality of trolley rails.

4. The cargo containment body as in claim 3, wherein
    the at least one movable wall panel comprises a plurality of movable wall panels;
    each of the plurality of trolleys supports by suspension only one of the plurality of movable wall panels; and
    each of the plurality of movable wall panels is movable between the first side and the second side independently of whether another one of the plurality of movable wall panels is being moved.

5. The cargo containment body as in claim 4, further comprising a plurality of lock rods, each of the plurality of lock rods being appurtenant to one of the plurality of movable wall panels for securing that one of the plurality movable wall panels so that it does not move.

6. The cargo containment body as in claim 2, wherein
    the at least one trolley rail comprises at least two trolley rails;
    the at least one trolley comprises at least two trolleys, with at least one of the at least two trolleys being movable along each one of the at least two trolley rails, respectively; and
    the at least one movable wall panel is suspended from at least two of the at least two trolleys.

7. The cargo containment body as in claim 1, further comprising at least one lock rod for securing the at least one movable wall panel so that it does not move.

8. The cargo containment body as in claim 1, further comprising:
    a top lock rod appurtenant to one of the at least one movable wall panels; and
    a top lock rod keeper fixed in the top, and structured and dimensioned to receive a top end of the top lock rod;
    wherein, when the top lock rod is received in the top lock rod keeper, the top lock rod will secure said one of the at least one movable wall panels so that said one of the at least one movable wall panels does not move.

9. The cargo containment body as in claim 8, further comprising:
    a vertical top lock rod sleeve in which the top lock rod is movable; and
    a top lock rod handle attached to the top lock rod and protruding through a gap in the sleeve;
    wherein a lower portion of the gap limits rotation of the handle about an axis of the top lock rod and, if the handle lifts the top lock rod in the sleeve until the top end is received in the top lock rod keeper, an upper portion of the gap allows rotation of the handle about the axis of the top lock rod to a resting position in a step notch so as to retain the top end in the top lock rod keeper.

10. The cargo containment body as in claim 1, further comprising:

a bottom lock rod appurtenant to one of the at least one movable wall panels; and a bottom lock rod keeper fixed in the bottom, and structured and dimensioned to receive a bottom end of the bottom lock rod;

wherein, when the bottom lock rod is received in the bottom lock rod keeper, the bottom lock rod will secure said one of the at least one movable wall panels so that said one of the at least one movable wall panels does not move.

11. The cargo containment body as in claim 10, further comprising:

a vertical bottom lock rod sleeve in which the bottom lock rod is movable; and a bottom lock rod handle attached to the bottom lock rod and protruding through a gap in the sleeve;

wherein a lower portion of the gap limits rotation of the handle about an axis of the bottom lock rod and, if the handle lifts the bottom lock rod in the sleeve until the bottom end is removed from the bottom lock rod keeper, an upper portion of the gap allows rotation of the handle about the axis of the bottom lock rod to a resting position in a step so as to retain the bottom end out of the bottom lock rod keeper while said one of the at least one movable wall panels is being moved.

12. The cargo containment body as in claim 1, further comprising:

a fixed vertical wall on the first side, the fixed vertical wall extending substantially parallel to the longitudinal axis between the front and the rear and extending substantially parallel to the vertical axis between the top and the bottom.

13. The cargo containment body as in claim 1, further comprising:

a ceiling in the top;
a floor in the bottom;
a vertical front wall in the front; and
a curtain track on the second side, the curtain track extending substantially parallel to the longitudinal axis between the front and the rear.

14. The cargo containment body as in claim 1, further comprising:

at least one first side movable wall panel that is movable in the direction of the lateral axis, and that always remains substantially parallel to the longitudinal axis and substantially parallel to the vertical axis;

wherein the at least one first side movable wall panel is sufficiently rigid so that it constitutes a wall to which the cargo may be stably affixed on the first side, if the at least one first side movable wall panel is secured at the first side; and alternatively, wherein the cargo can be loaded and unloaded through the first side if the at least one first side movable wall panel is moved away from the first side and toward the second side.

15. The cargo containment body as in claim 1, wherein the at least one movable wall panel is movable between the first side and the second side on at least one floor track extending substantially parallel to the lateral axis between the first side and the second side.

16. A transportation carrier comprising:
a motor-powered truck vehicle; and
a cargo containment body as in claim 1 that is attached to the truck vehicle.

17. The cargo containment body as in claim 1, further comprising means for moving the at least one movable wall panel between the first side and the second side.

18. The cargo containment body as in claim 1, further comprising means for securing the at least one movable wall panel so that it does not move.

19. The cargo containment body as in claim 1, further comprising:

a ceiling in the top;
a floor in the bottom;
a vertical front wall in the front; and
means for supporting a curtain on the second side.

20. A method for including in a single cargo containment body both the ability to load and unload lengthy cargo through a second side of the cargo containment body and the ability to stably affix small cargo to the second side, the cargo containment body being for attachment to a transportation carrier and containment of cargo being transported by the transportation carrier, the cargo containment body having a longitudinal axis extending between a front and a rear of the cargo containment body, having a lateral axis orthogonal to the longitudinal axis and extending between a first side and the second side of the cargo containment body, and having a vertical axis orthogonal to the longitudinal axis and to the lateral axis and extending between a top and a bottom of the cargo containment body, the method comprising:

providing at least one movable wall panel that is movable in the direction of the lateral axis, and that always remains substantially parallel to the longitudinal axis and substantially parallel to the vertical axis;

wherein the at least one movable wall panel is sufficiently rigid so that it constitutes a wall to which the small cargo may be stably affixed on the second side, if the at least one movable wall panel is secured at the second side; and alternatively, wherein the lengthy cargo can be loaded and unloaded through the second side if the at least one movable wall panel is moved away from the second side and toward the first side.

21. The method as in claim 20, further comprising:
providing at least one trolley rail in the top, the at least one trolley rail extending substantially parallel to the lateral axis between the first side and the second side;

providing at least one trolley that is movable along the at least one trolley rail between the first side and the second side; and suspending the at least one movable wall panel from the at least one trolley so that the at least one movable wall panel is movable with the at least one trolley between the first side and the second side.

22. The method as in claim 21, wherein
the at least one trolley rail comprises a plurality of trolley rails;

the at least one trolley comprises a plurality of trolleys, each of the plurality of trolleys being movable along only one of the plurality of trolley rails;

the at least one movable wall panel comprises a plurality of movable wall panels;

each of the plurality of trolleys supports by suspension only one of the plurality of movable wall panels; and each of the plurality of movable wall panels is movable between the first side and the second side independently of whether another one of the plurality of movable wall panels is being moved.

23. The method as in claim 22, further comprising providing a plurality of lock rods, each of the plurality of lock rods being appurtenant to one of the plurality of movable wall panels for securing that one of the plurality movable wall panels so that it does not move.

24. The method as in claim 20, further comprising providing at least one lock rod for securing the at least one movable wall panel so that it does not move.

25. The method as in claim 20, further comprising:
providing a ceiling in the top;
providing a floor in the bottom;
providing a vertical front wall in the front; and
providing a curtain track on the second side, the curtain track extending substantially parallel to the longitudinal axis between the front and the rear.

* * * * *